US012030273B2

(12) United States Patent
Totani et al.

(10) Patent No.: US 12,030,273 B2
(45) Date of Patent: Jul. 9, 2024

(54) BAG MAKING APPARATUS

(71) Applicant: Totani Corporation, Kyoto (JP)

(72) Inventors: Mikio Totani, Kyoto (JP); Tatsuo Odani, Kyoto (JP)

(73) Assignee: Totani Corporation, Kyoto (JP)

( * ) Notice: Subject to any disclaimer, the term of this patent is extended or adjusted under 35 U.S.C. 154(b) by 0 days.

(21) Appl. No.: 18/027,121

(22) PCT Filed: Aug. 3, 2021

(86) PCT No.: PCT/JP2021/028717
§ 371 (c)(1),
(2) Date: Mar. 20, 2023

(87) PCT Pub. No.: WO2022/064860
PCT Pub. Date: Mar. 31, 2022

(65) Prior Publication Data

US 2023/0330961 A1 Oct. 19, 2023

(30) Foreign Application Priority Data

Sep. 25, 2020 (JP) ................................ 2020-160651

(51) Int. Cl.

| | |
|---|---|
| ***B31B 70/64*** | (2017.01) |
| ***B31B 70/00*** | (2017.01) |
| ***B31B 70/20*** | (2017.01) |
| ***B31B 70/81*** | (2017.01) |
| *B31B 150/00* | (2017.01) |

(52) U.S. Cl.
CPC ............ *B31B 70/64* (2017.08); *B31B 70/006* (2017.08); *B31B 70/20* (2017.08); *B31B 70/8132* (2017.08); *B31B 2150/002* (2017.08)

(58) Field of Classification Search
CPC ....... B31B 70/64; B31B 70/006; B31B 70/20; B31B 70/8132; B31B 2150/002
USPC .......................................................... 493/186
See application file for complete search history.

(56) References Cited

U.S. PATENT DOCUMENTS

2002/0068668 A1* 6/2002 Chow ..................... B31B 70/25
493/62
2015/0183176 A1* 7/2015 Totani ................. B29C 65/1687
493/213

FOREIGN PATENT DOCUMENTS

| | | |
|---|---|---|
| EP | 2505347 | 12/2016 |
| EP | 2889122 | 10/2018 |
| JP | S6071490 | 5/1985 |

(Continued)

*Primary Examiner* — Jacob A Smith
(74) *Attorney, Agent, or Firm* — JCIPRNET

(57) ABSTRACT

A bag making apparatus includes a welding device for welding a sheet panel and a strip member in a zone where the sheet panel is intermittently fed by a feed device and a cut device disposed downstream of the welding device to cross-cut the sheet panel and the strip member every intermitted feed cycle. The welding device include a pressure unit for pressurizing the sheet panel and the strip member superposed on each other and a laser unit for irradiating the sheet panel or the strip member with a laser beam at an irradiation position upstream of a pressure position of the pressure unit to melt the sheet panel or the strip member. The pressure unit and the laser unit are configured to be movable together upstream and downstream relative to the sheet panel while maintaining a relative positional relationship between the pressure position and the irradiation position.

3 Claims, 11 Drawing Sheets

(56) References Cited

FOREIGN PATENT DOCUMENTS

| | | | | | |
|---|---|---|---|---|---|
| JP | 2004181882 | | | 7/2004 | |
| JP | 2004358529 | | | 12/2004 | |
| JP | 4819110 | | | 11/2011 | |
| JP | 4902796 | | | 3/2012 | |
| JP | 5619268 | | | 11/2014 | |
| JP | 2016043523 | | | 4/2016 | |
| JP | 2016043523 | A | * | 4/2016 | ............... B31B 1/12 |
| JP | 6023293 | | | 11/2016 | |
| JP | 2016198218 | | | 12/2016 | |
| JP | 2017226128 | | | 12/2017 | |
| JP | 2019195930 | | | 11/2019 | |
| JP | 2019196238 | | | 11/2019 | |

* cited by examiner

BAG MAKING APPARATUS

CROSS-REFERENCE TO RELATED APPLICATION

This application is a 371 application of an international PCT application serial no. PCT/JP2021/028717, filed on Aug. 3, 2021, which claims the priority benefits of Japan Patent Application No. 2020-160651, filed on Sep. 25, 2020. The entirety of each of the above-mentioned patent applications is hereby incorporated by reference herein and made a part of this specification.

TECHNICAL FIELD

The present disclosure relates to a bag making apparatus for welding a continuous sheet panel and a continuous strip member to each other using laser irradiation and pressurization and successively making bags from the sheet panel and the strip member.

BACKGROUND

Bag making apparatuses for successively making bags from a continuous sheet panel and a continuous zipper are well known as disclosed in Patent documents 1 and 2. The bag making apparatus includes a welding device configured to weld the sheet panel and the zipper to each other, and a cross cut device configured to cross-cut the sheet panel and the zipper in their width direction after welding so as to shape a bag.

The welding device in each of Patent documents 1 and 2 includes a pair of pressure rollers opposing each other for pressurizing the sheet panel and the zipper, a feed device configured to intermittently feed the sheet panel and the zipper in their longitudinal direction through the pair of pressure rollers in a state in which they are superposed on each other, and a laser device configured to irradiate the zipper with a laser beam at a position upstream of the pair of pressure rollers.

Irradiating the zipper with a laser beam causes its irradiated part to be heat-melted by the laser beam. The sheet panel and the zipper are then guided to the pair of pressure rollers to be superposed on each other. When the sheet panel and the zipper are fed through the pair of pressure rollers, they are pressurized by the pair of pressure rollers and thus welded to each other.

The temperature at the irradiated part is decreasing while this part is being fed from the irradiation position of the laser beam to the pair of pressure rollers. For proper welding, the molten state of the irradiated part should be maintained until the irradiated part reaches the pair of pressure rollers.

The sheet panel and the zipper are intermittently fed. This means that the sheet panel and the zipper are repeatedly fed and paused. During the pause phase of the intermittent feed cycle, the irradiated part which is located in the section from the irradiation position to the pair of pressure rollers cools down to return from the molten state to the non-molten state. When the sheet panel and the zipper are then fed again, the irradiated part is pressed in the non-molten state against the sheet panel by the pair of pressure rollers, and consequently fails to be welded to the sheet panel. In this way, the unwelded part, which was subject to the laser irradiation and the pressurization but failed to be welded, is generated every intermittent feed cycle. The unwelded part can be a cause of leakage in making bags, have an influence on the quality of the bags, and in addition, cause the loss of material.

The present disclosure provides a bag making apparatus capable of reducing problems that can be caused by such an unwelded part.

CITATION LIST

Patent Document

Patent document 1: JP6023293B1 Patent document 2: JP5619268B1 Patent document 3: JP4819110B1 Patent document 4: JP4902796B1 Patent document 5: JP2019-196238A Patent document 6: JP2016-198218A

SUMMARY

According to an aspect of the present disclosure, there is provided a bag making apparatus for successively making bags from a continuous sheet panel and a continuous strip member. The bag making apparatus includes: a feed device configured to intermittently feed the sheet panel and the strip member in a longitudinal direction of the sheet panel and the strip member; a welding device configured to weld the sheet panel and the strip member to each other in a zone where the sheet panel is intermittently fed by the feed device; and a cut device disposed downstream of the welding device and configured to cross-cut the sheet panel and the strip member in a width direction of the sheet panel during every intermittent feed cycle. The welding device include: a pressure unit configured to pressurize the sheet panel and the strip member superposed on each other; and a laser unit configured to irradiate the sheet panel or the strip member with a laser beam at an irradiation position upstream of a pressure position of the pressure unit to melt the sheet panel or the strip member using the laser beam. The pressure unit and the laser unit are configured to be movable together upstream and downstream with respect to the sheet panel while maintaining a positional relationship between the pressure position and the irradiation position.

For example, the bag making apparatus may further include: a sensor for detecting a position of the welding device; an indicator; and a control device configured to determine, based on detection by the sensor, a relative positional relationship between the position of the welding device and a separation position which is spaced upstream away from a cross cut position of the cut device by an integer multiple of a pitch of intermittent feed along a feed path, wherein the control device is further configured to indicate information regarding said relative positional relationship on the indicator.

The information may include an offset distance of a midpoint between the pressure position and a downstream end of the irradiation position relative to the separation position.

For example, the bag making apparatus may further include: a sensor for detecting a position of the welding device; a movement device for moving the pressure unit and the laser unit together upstream and downstream while maintaining a relative positional relationship between the pressure position and the irradiation position; and a control device configured to control the movement device based on detection by the sensor to position the pressure unit and the laser unit.

The control device may be configured to control the movement device based on detection by the sensor to make a midpoint between the pressure position and a downstream end of the irradiation position spaced away from the cross cut position by an integer multiple of a pitch of intermittent feed along a feed path.

For example, the bag making apparatus may further include: a sensor for detecting positions of print patterns repeatedly printed on the sheet panel; a movement device configured to move the pressure unit, the laser unit and the sensor together whiling maintaining a positional relationship between the pressure position and the irradiation position; and a control device configured to control the movement device based on detection by the sensor to position the pressure unit and the laser unit.

For example, the bag making apparatus may further include: at least one sensor for detecting positions of print patterns repeatedly printed on the sheet panel and detecting positions of unwelded parts generated due to failure by the welding device to weld the sheet panel and the strip member; an indicator; and a control device configured to determine a relative positional relationship between a print pattern and an unwelded part and to indicate information regarding said relative positional relationship on the indicator.

For example, the bag making apparatus may further include: at least one sensor for detecting positions of print patterns repeatedly printed on the sheet panel and detecting positions of unwelded parts generated due to failure by the welding device to weld the sheet panel and the strip member; a movement device for moving the pressure unit and the laser unit together upstream and downstream while maintaining a relative positional relationship between the pressure position and the irradiation position; and a control device configured to control the movement device based on detection by the at least one sensor to position the pressure unit and the laser unit.

For example, the bag making apparatus may further include a movement device including a handle. The movement device may be configured to move, in response to operation of the handle, move the pressure unit and the laser unit together upstream and downstream while maintaining a relative positional relationship between the pressure position and the irradiation position.

The pressure unit may include a pair of pressure members opposing each other for pressurizing the sheet panel and the strip member. The pressure position may be a nip position of the pair of pressure members.

The pair of pressure members may be a pair of pressure rollers.

The laser unit may be configured to interlink irradiation intensity of the laser beam with feed speed of intermittent feed.

The bag making apparatus may further include a seal device disposed downstream of the welding device and upstream of the cut device and configured to seal the sheet panel in the width direction of the sheet panel during every intermittent feed cycle. A distance along a feed path between a cross cut position of the cut device and a seal width center of a seal position of the seal device may be an integer multiple of a pitch of intermittent feed.

The bag making apparatus is configured to make bags from the sheet panel and a continuous zipper as the strip member.

DETAILED DESCRIPTION

Bag making apparatuses according to the implementations will be described below with reference to the drawings. Same or similar components in the respective implementations are indicated by the same numerals.

Figures 1A, 1B, 1C:
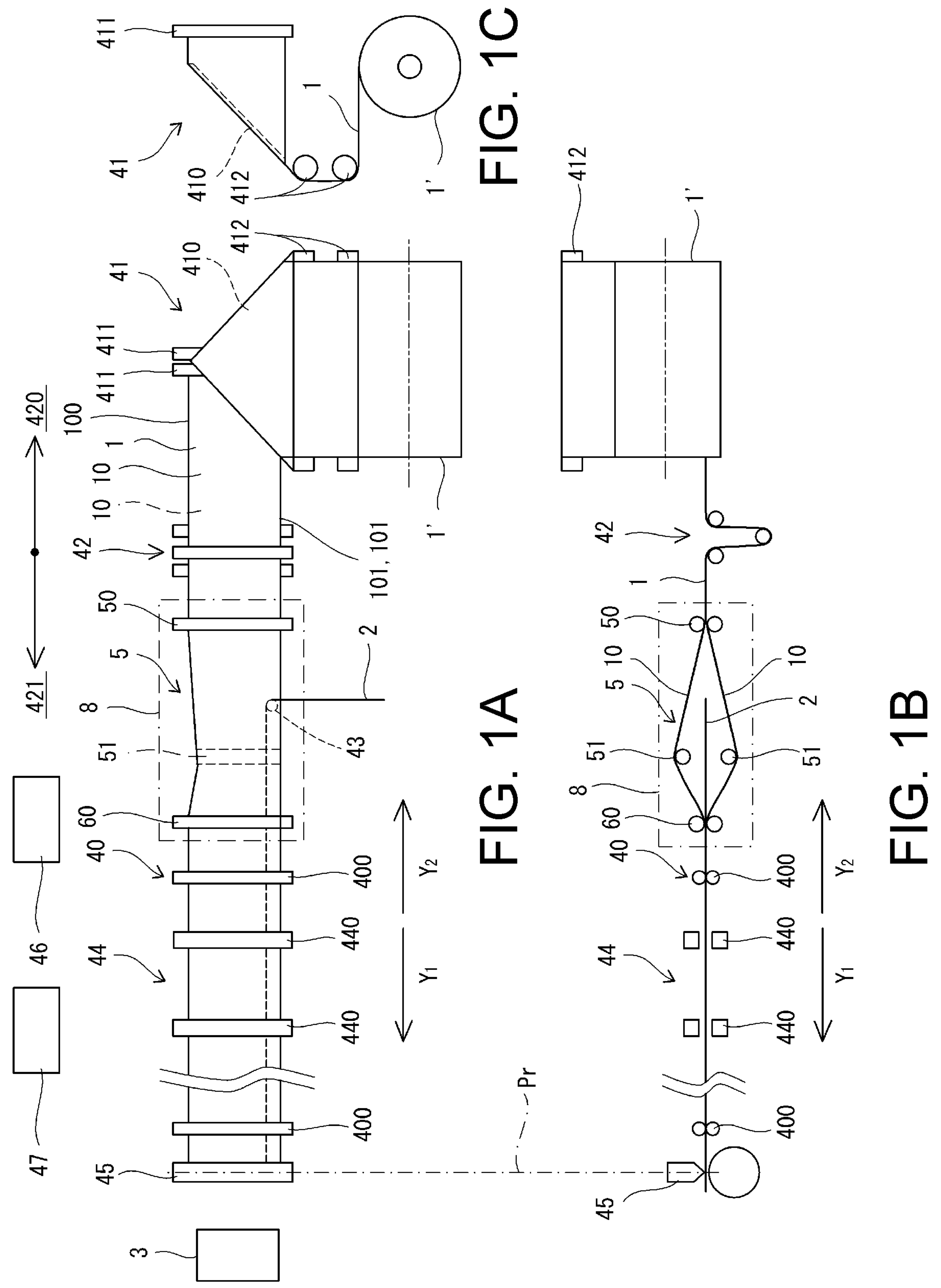
FIG. 1A is a schematic plan view of an example bag making apparatus.
FIG. 1B is a front view of FIG. 1A.
FIG. 1C is a side view of FIG. 1A.

An example bag making apparatus is illustrated in FIG. 1A to FIG. 1C. The bag making apparatus successively makes bags 3 from a continuous sheet panel 1 and a continuous strip member 2. The strip member 2 has a narrower width than that of the sheet panel 1.

The bag making apparatus includes a feed device 40 that intermittently feeds the sheet panel 1 and the strip member 2 welded to the sheet panel 1 as described below, in their longitudinal (continuous) direction. The direction $Y_1$ designates the feed direction. The feed device 40 in the implementation includes ono or more pairs of drive rollers 400. FIG. 1A and FIG. 1B illustrates two pairs of drive rollers 400 spaced from each other. The pairs of drive rollers 400 intermittently feed the sheet panel 1 and the strip member 2 by intermittently rotating in synchronization with each other while sandwiching these. The feed device 40 intermittently feeds the sheet panel 1 and the strip member 2 at the feed pitch determined depending on the dimensions of the bags 3.

The bag making apparatus supports a roll 1' at the most upstream end thereof. The sheet panel 1 is unrolled from the roll 1' in the longitudinal direction thereof at a constant speed. The bag making apparatus includes a folding device 41 that folds the sheet panel 1 in half. The folding device 41 includes a triangular plate 410, a pair of suction rollers 411 and guide rollers 412. The sheet panel 1 is guided to the triangular plate 410 via the guide rollers 412 to be folded in half by the triangle plate 410 and the pair of suction rollers 411.

As a result of folding the sheet panel 1 in half, the sheet panel 1 has two panel parts 10 as its two layers. The reference sign 100 in FIG. 1A designates the folded edge resulting from folding the sheet panel 1 in half. The reference sign 101 in FIG. 1A designates the opposite side edges aligned with each other due to folding the sheet panel 1 in half.

The bag making apparatus includes a dancer device 42 disposed downstream of the folding device 41. The dancer device 42 includes a dancer roller. The dancer device 42 appropriately switches the feed of the sheet panel 1 from continuous feed to intermittent feed. Thus, the zone 420 upstream of the dancer device 42 is a zone where the sheet panel 1 is continuously fed, whereas the zone 421 downstream of the dancer device 42 is a zone where the sheet panel 1 is intermittently fed by the feed device 40.

The bag making apparatus includes a welding device 5 disposed downstream of the dancer device 42. The welding device 5 welds the sheet panel 1 and the strip member 2 to each other in the zone 421 where the sheet panel 1 is intermittently fed by the feed device 40.

The welding device 5 in the implementation includes a pair of expansion rollers 51 arranged downstream of the pair of guide rollers 50 and upstream of the pair of pressure rollers 60. The sheet panel 1 is expanded by the pair of expansion rollers 51 on the side of the side edge 101 in the zone from the pair of guide rollers 50 to the pair of pressure rollers 60, so that a space is created between the two panel parts 10.

As illustrated in FIG. 1A, the continuous strip member 2 is guided, diverted and inserted between the two panel parts 10 by a guide roller 43 through the space obtained by the pair of expansion rollers 51. The welding device 5 welds the sheet panel 1 and the strip member 2 to each other using laser radiation and pressurizing. Specifically, the welding device 5 welds the strip member 2 to the two panel parts 10.

The bag making apparatus further includes a seal device 44 arranged downstream of the welding device 5. The seal device 44 heat-seals the sheet panel 1 in the width direction of the sheet panel 1 over the entire width of the sheet panel 1 to form a cross sealed section 11 (FIG. 5A) during every intermittent feed cycle, specifically during every pause phase of the intermittent feed cycle. The seal device 44 in the implementation includes one or more pairs of heat seal members 440 (for example, heat seal bars). FIG. 1A illustrates two pairs of heat seal members 440. It sandwiches the two panel parts 10 using the pairs of seal members 44 to heat-seal them to each other, thereby forming the cross sealed section 11. Alternatively, the seal device 44 may ultrasonic-seal the sheet panel 1 using ultrasonic-sealing means, thereby forming the cross sealed section 11.

Figure 5A:
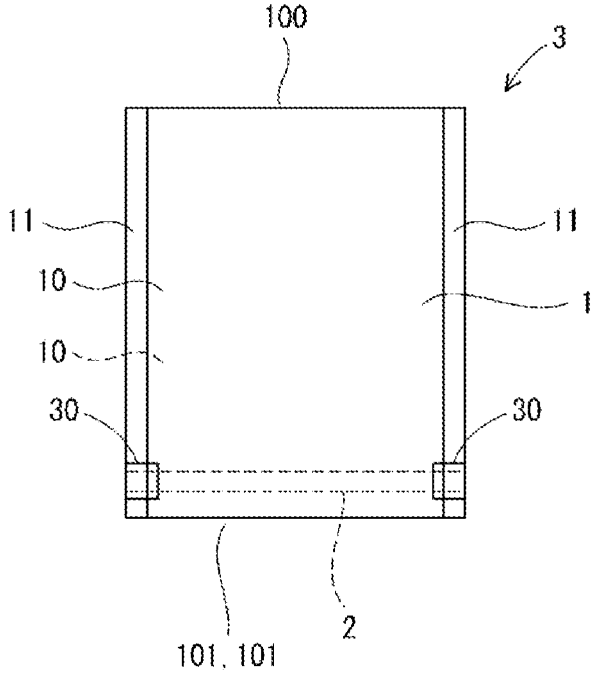
FIG. 5A is a view of an example plastic bag.

The bag making apparatus further includes a cut device 45 disposed downstream of the seal device 44, specifically at the most downstream end of the bag making apparatus. The cut device 45 cross-cuts the sheet panel 1 and the strip member 2 in the width direction of the sheet panel 1 during every intermittent feed cycle of the sheet panel 1, specifically during every pause phase of the intermittent feed cycle. Every cross-cutting, the bag 3 illustrated in FIG. 5A is made from the sheet panel 1 and the strip member 2 cut off by the cross-cutting. The cut device 45 cross-cuts the sheet panel 1 and the strip member 2 at the width center of the cross sealed section 11. Therefore, the distance between the cut device 45 and the seal device 44 along the feed path for the sheet panel 1/strip member 2 is adjusted during every pause phase of the intermittent feed cycle such that the width center of a cross sealed section 11 is aligned with the cross cut position Pr at which the cut device 45 cross-cuts the sheet panel 1 and the strip member 2.

The bag making apparatus further includes an indicator 46 for indicating bag making condition and information about a position of each device of the bag making apparatus. The bag making condition includes, for example, information related to the dimensions of the bags to be made, the bag making speed, and the temperature of the seal members 440. The indicator 46 may be a display. The indicator 46 may include a touch screen, buttons, etc., and may be configured as operating means to be operated by an operator.

The bag making apparatus further includes a control device 47 electrically connected to at least above devices 40, 42, 44, 45, 46 and 5 to control these devices 40, 42, 44, 45, 46 and 5. The control device 47 includes a controller.

Welding using the welding device 5 will be described below.

The sheet panel 1 in the implementation is a plastic film. The bag 3 in the implementation is, therefore, a plastic bag. The sheet panel 1 is a laminated film having one surface composed of a base layer such as PET and the other surface composed of a sealant layer such as polyethylene, which has a lower melting point than the base layer. The sheet panel 1 is folded in half by the folding device 41 such that the sealant layers face each other. When the sheet panel 1 is heat-sealed by the seal device 44, this causes the two panel parts 10 to be heat-sealed to each other due to the melting of the sealant layer, so that a cross sealed section 11 is formed.

The sheet panel 1 is not limited to the above configurations. The sheet panel 1 may consists of mono-material such as polyethylene, polypropylene, etc. Also, the sheet panel 1 may be composed of paper as a base and a resin coating the paper. In other words, the sheet panel 1 may consist of a mono-material or multiple materials, as long as it is possible to implement the bag making.

Figure 4A:
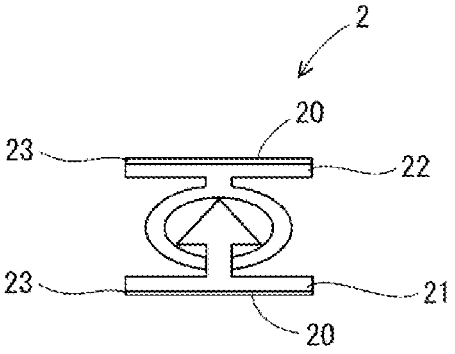
FIG. 4A is a cross section of an example strip member.

As illustrated in FIG. 4A, the strip member 2 in the implementation is a zipper which allows the bag 3 to be freely opened and closed. As in Patent documents 1 and 2, a zipper as the continuous strip member 2 includes a male member 21 and a female member 22 which are detachably fitted to each other. The male member 21 has a surface 20 to be welded to one panel part 10, and the female member 22 has a surface 20 to be welded to the other panel part 10. The strip member 2 is supplied and then welded to the sheet panel 1 with the male member 21 and the female member 22 fitted to each other.

The strip member 2 in the implementation is made of resin. Alternatively, as long as at least surface 20 to be welded of the strip member 2 is made of a material such as resin that allows for welding, the other parts of the strip member 2 may be made of other materials. That is, the strip member 2 may consist of a mono-material or multiple materials as long as it is possible to implement the bag making.

Figure 2A:
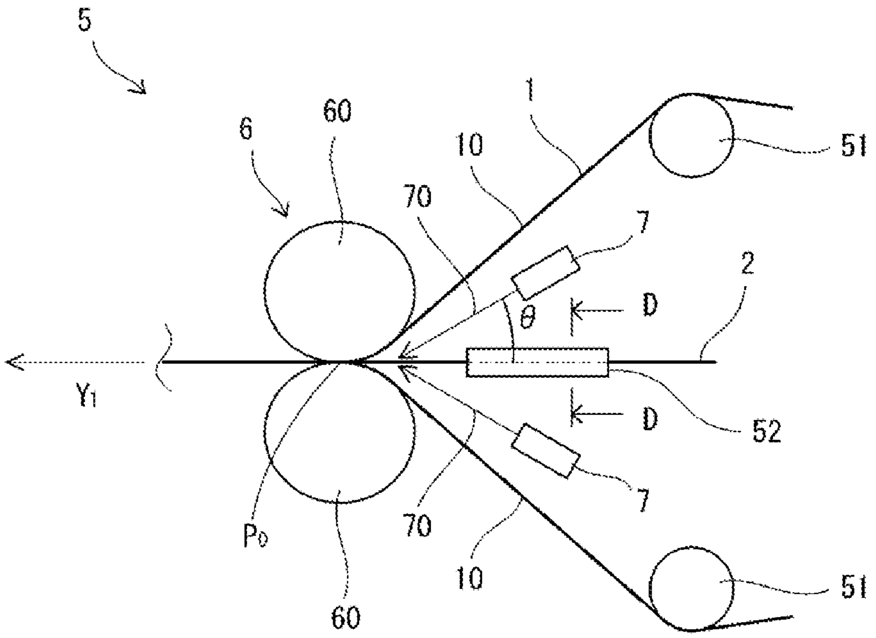
FIG. 2A and FIG. 2B illustrate a welding method using laser radiation and pressurization.

FIG. 2A schematically illustrates the positional relationship among main components of an example welding device 5. The welding device 5 includes a pressure unit 6 for pressurizing the sheet panel 1 and the strip member 2 superposed on each other. The pressure unit 6 in the implementation includes the aforementioned pair of pressure rollers 60 as a pair of pressure members opposing each other for pressurizing the sheet panel 1 and the strip member 2. The sheet panel 1 and the strip member 2 are fed in a superposed state by the feed device 40 though the pair of pressure rollers 60. The sheet panel 1 and the strip member 2 are pressurized by the pair of pressure rollers 60 while passing through the pair of pressure rollers 60. Thus, the pressure position $P_0$ of the pressure unit 6 in the implementation is a nip position of the pair of pressure rollers 60.

The welding device 5 includes at least one laser unit 7 that irradiates the sheet panel 1 or the strip member 2 with a laser beam 70 at a position upstream of the pressure position $P_0$ to melt the sheet panel 1 or the strip member 2 using the laser beam 70.

Two laser units 7 are provided in the implementation, each of which includes a laser light source, an optical system and so on. One laser unit 7 is arranged to irradiate one surface 20 of the strip member 2 with the laser beam 70 in a spot manner, the other laser unit 7 is arranged to irradiate the other surface 20 of the strip member 2 with the laser beam 70 in a spot manner.

As in Patent documents 1 and 2, each laser unit 7 is arranged to irradiate the strip member 2 with the laser beam 70 at the irradiation angle θ ($0<\theta=<90$). As illustrated in FIG. 4A, each surface 20 is made of a light absorption layer 23 which absorbs the laser beam 70.

As in Patent documents 1 and 2, the laser unit 7 interlinks the irradiation intensity of the laser beam 70 with the speed of the intermittent feed to maintain uniformity of the strength of the welding when welding with the laser beam 70 during the intermittent feed. It increases the irradiation intensity when the sheet panel 1 is fed at a higher speed, correspondingly it decreases the irradiation intensity when the sheet panel 1 is fed at a lower speed. In other words, the laser unit 7 is configured to radiate the laser beam 70 while controlling the irradiation intensity of the laser beam 70 in accordance with the feed speed.

Figure 3:
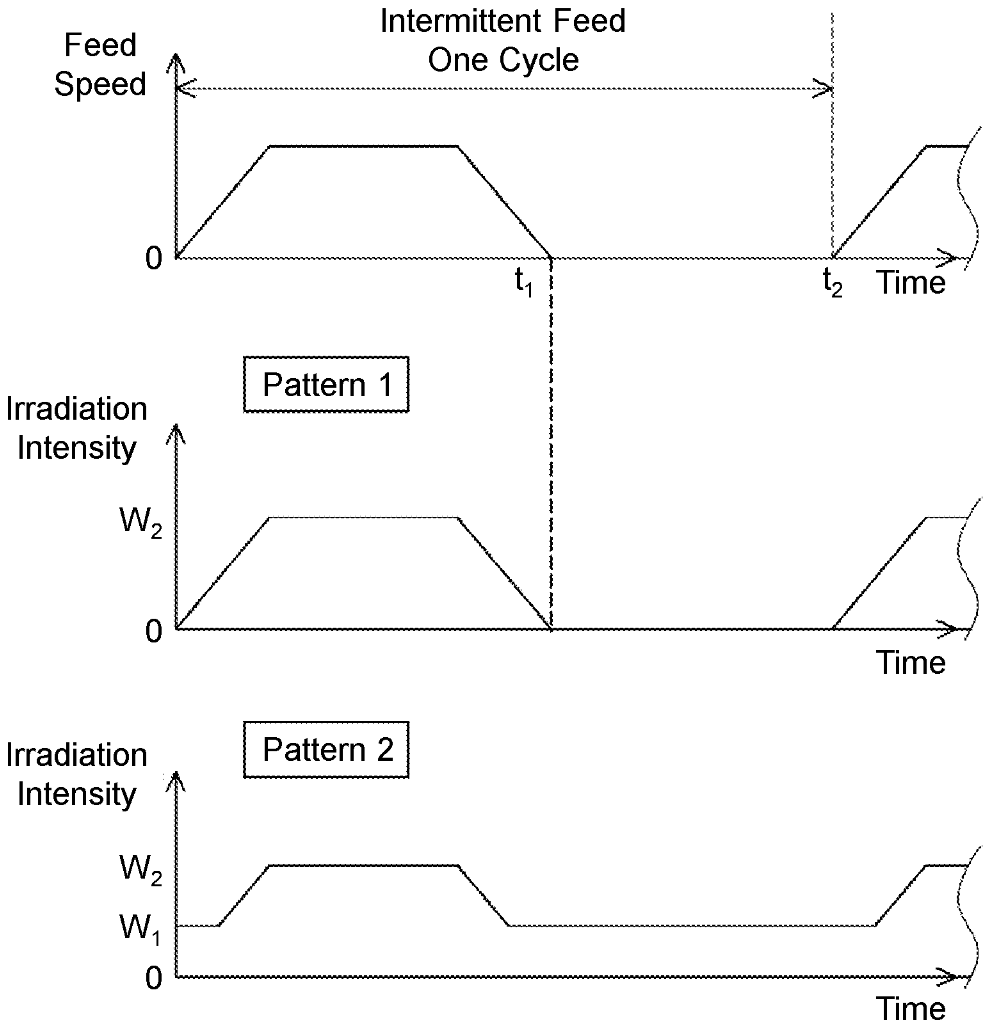
FIG. 3 illustrates relationships between feed speed of a sheet panel and irradiation intensity of a laser beam.

The example of this is illustrated in FIG. 3. In the pattern 1, the irradiation intensity is in complete proportion to the feed speed, which means that the irradiation intensity is zero (i.e., the laser beam 70 is not radiated) when the feed speed is zero. In contrast, in the pattern 2, the irradiation intensity is in proportion to the feed speed but is controlled such that it is not less than the minimum predetermined value $W_1$ ($0<W_1<W_2$; $W_2$ is the irradiation intensity value when the feed speed is maximum). This means that the laser beam 70 is radiated continuously while the web 1 is not only being fed but also being paused. The laser unit 7 sets the output to zero for the pattern 1, whereas it does not set the output to zero for the pattern 2. Since the laser unit 7 is generally subjected to the highest load when outputting from the zero-output state, the pattern 2, which has lesser burden on the laser unit 7 than the pattern 1, is preferable.

Figure 4B:
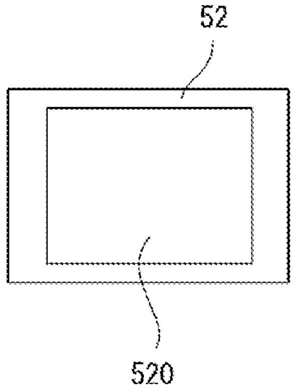
FIG. 4B is a D-D line cross section of FIG. 2A, illustrating a cross sectional view of a guide body.

As illustrated in FIG. 2A, the welding device 5 includes a guide body 52 for guiding the strip member 2 through the pair of pressure rollers 60 without meandering of the strip member 2. FIG. 4B is a D-D line cross section of FIG. 2A, illustrating a cross-section of the guide body 52. The guide body 52 has a hole 520 through which the strip member 2 passes. As is clear from FIGS. 4A and 4B, the guide hole 520 has a vertical dimension slightly larger than the vertical dimension of the strip member 2 and a horizontal dimension slightly larger than the horizontal dimension of the strip member 2.

As illustrated in FIG. 2A, when the sheet panel 1 and the strip member 2 are fed (FIG. 3: $0<t<t_1$), the sheet panel 1 (panel parts 10) is guided through a pair of pressure rollers 60 via the pair of expansion rollers 51. The sheet panel 1 and the strip member 2 are caused to be superposed on each other at a position right before the pressure position $P_0$. In the implementation, the strip member 2 is sandwiched between the two panel parts 10. At this time, one surface 20 of the strip member 2 comes into contact with one of the panel parts 10, and the other surface 20 of the strip member 2 comes into contact with the other panel part 10. The sheet panel 1 and the strip member 2 are then fed through the pair of pressure rollers 60 in a superposed state.

When the strip member 2 is fed through the radiation position R (FIG. 2B) spaced upstream away from the pressure position $P_0$, the surface 20 (light absorption layer 23) is irradiated with the laser beam 70 to be melted by the laser beam 70. The molten surface 20 then comes into contact with the sheet panel 1 (the panel part 10) and passes through the pair of pressure rollers 60 in this state. When the sheet panel 1 and the strip member 2 are fed through the pair of pressure rollers 60, they are pressurized at the pressure position $P_0$ by the pair of pressure rollers 60. As a result, the sheet panel 1 and the strip member 2 are welded to each other.

Figure 2B:
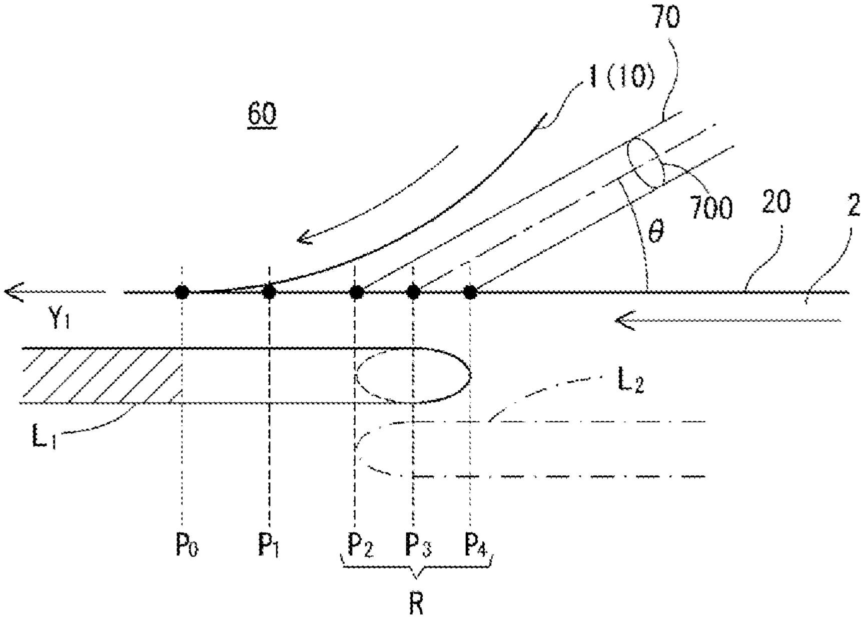

FIG. 2B illustrates the situation when the time is $t_1$ (see FIG. 3), i.e., the moment the sheet panel 1 and the strip member 2 have just started to be paused. The hatched part in line $L_1$ indicates the welded part. The surface 20 in the section $P_0$-$P_2$ is melted as it has been irradiated with the laser beam 70, but is not welded to the web 1. FIG. 2B illustrates only one of the panel parts 10 and one of the pressure rollers 60. FIG. 2B separately illustrates the end part of the line $L_1$ irradiated with the laser beam 70 and the start part of line $L_2$ to be irradiated with the laser beam 70 for the purpose of convenience.

Since, the part of the strip member 2 located in the section $P_0$-$P_2$ during a pause phase of the intermittent feed cycle has been irradiated with the laser beam 70 during the previous feed of the sheet panel 1, the surface 20 thereof is in the molten state when $t=t_1$. However, it returns to the non-molten state (solid state) during the pause phase of the intermittent feed cycle due to decrease in temperature. Consequently, when the sheet panel 1 and the strip member 2 are pressurized by the pair of pressure rollers 60 during the next feed phase of the intermittent feed cycle ($t>t_2$), they fail to be welded to each other in the area where they have returned to the non-molten state. The laser beam 70 starts to radiate at the position $P_2$. Thus, the part of the strip member 2 located in the section $P_2$-$P_4$ during a pause phase of the intermittent feed cycle will be welded to the sheet panel 1 during the next feed phase of the intermittent feed cycle.

In other words, the unwelded area q (FIG. 8), which is an area in the feed direction $Y_1$ where the sheet panel 1 and the strip member 2 are completely not welded to each other and has a length corresponding to the distance of the section $P_0$-$P_2$, is generated every intermittent feed cycle. Specifically, the distance of the section $P_0$-$P_2$ is a distance between the pressure position $P_0$ and the downstream end of the irradiation position R.

The part of the surface 20 in the section $P_2$-$P_3$ is partially welded and not partially welded due to the spot shape of the cross section 700 of the laser beam 70. Therefore, the unwelded part Q (FIG. 8), which is not welded although was subject to the laser radiation and the pressurization and has a length corresponding to the distance of the section $P_0$-$P_3$, is generated every intermittent feed cycle. The downstream part with the length corresponding to the distance of the section $P_0$-$P_2$ in the unwelded part Q is the unwelded area q defined as described above.

The pressure unit 6 and the laser units 7 are configured to be movable upstream (i.e., in the direction $Y_2$) and downstream (i.e., in the direction $Y_1$) together with respect to the sheet panel 1, the strip member 2, the seal device 44, the cut device 45, and so on, while maintaining the relative positional relationship between the pressure position $P_0$ and the irradiation position R.

For this, the bag making apparatus further includes a movement device 8 (FIG. 1A, FIG. 1B) that moves the pressure unit 6 and the laser units 7 together upstream and downstream with respect to the sheet panel 1, the strip member 2, the seal device 44, the cut device 45, and so on. In the implementation, the pressure unit 6, the laser units 7, the pair of guide rollers 50, the pair of expansion rollers 51, and the guide body 52, i.e., the whole of the welding device 5, are moved in unison by the movement device 8.

Figure 6:
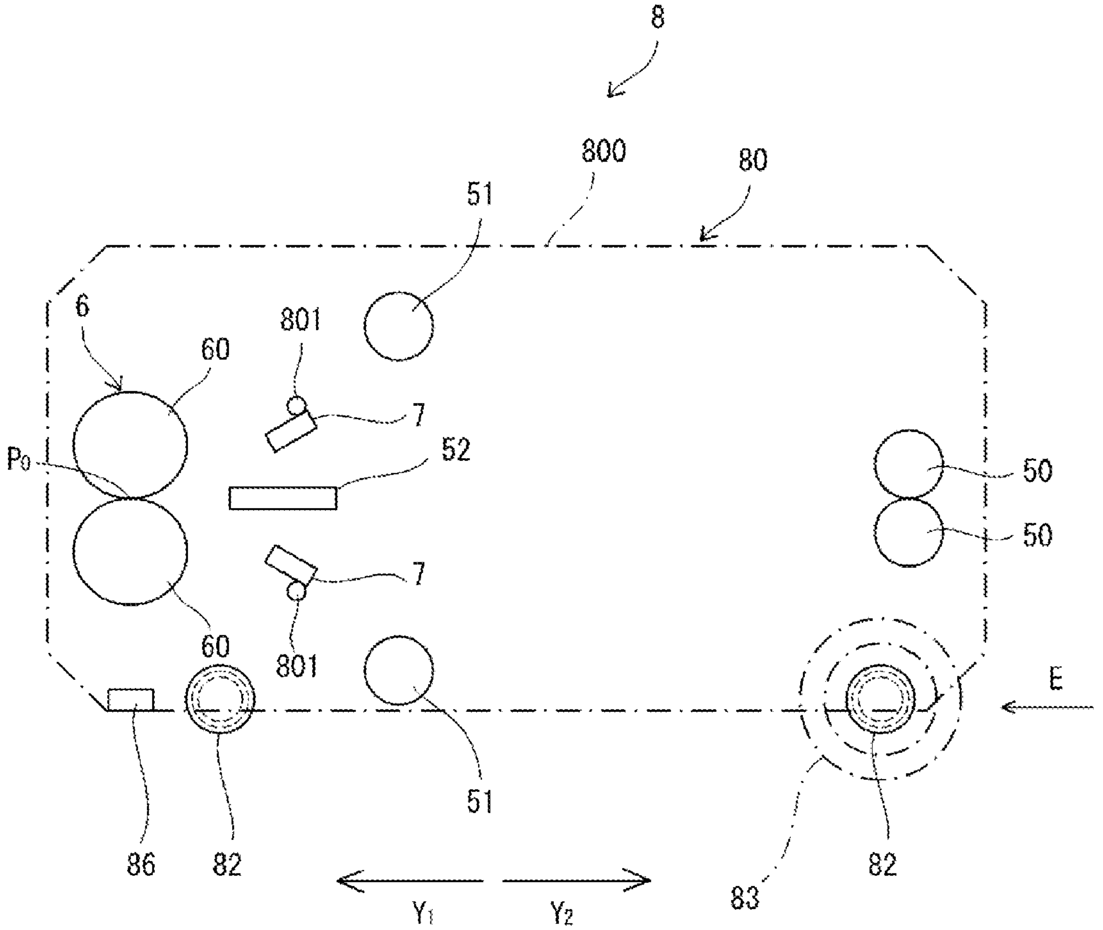
FIG. 6 is a schematic view of an example movement device.

FIG. 6 schematically illustrates an example movement device 8 of FIG. 1B. In FIG. 6, the presser unit 6, the laser units 7, the pair of guide rollers 50, the pair of expansion rollers 51, and the guide body 52 are illustrated in solid lines, and the components located in front of them on the paper are illustrated in single-dotted lines.

The movement device 8 includes a support arrangement 80 that supports the pressure unit 6, the laser units 7, the pair of guide rollers 50, the pair of expansion rollers 51, and the guide body 52 with the positional relationships illustrated in FIGS. 1B and 2A.

In the implementation, the support arrangement 80 has two side frames 800 facing each other in the width direction of the sheet panel 1 with a space larger than the width of the sheet panel 1 (which has been folded in half) and interposing the sheet panel 1 which is on the feed path. Of the two side frames, the side frame closer to the side edge 101 (FIG. 1A) is indicated by the reference sign 800, whereas the side frame closer to the folded edge 100 (FIG. 1A) is not illustrated.

The pair of pressure rollers 60 and the pair of guide rollers 50 are rotatably supported by both side frames 800. The pair of expansion rollers 51 is rotatably supported by one side frame 800 only.

The support arrangement 80 further includes base shafts 801 rotatably supported by the side frame 800 and extending by the predetermined distance in the direction towards the side frame that is not illustrated. Each of the laser units 7 is supported by the base shaft 801. The base shaft 801 has been rotated with respect to the side frame 800, so that the irradiation angle θ has been adjusted in advance, and it is fixed to the side frame 800 in the adjusted state. The support arrangement 80 include a guide bracket (not illustrated) via which the guide body 52 is supported by the side frame 800.

Thus, in the implementation, when the sheet panel 1 is set in the bag making apparatus, the laser units 7 and the guide body 52 are arranged between the panel parts 10 which are expanded by the pair of expansion rollers 51.

Figure 7A:
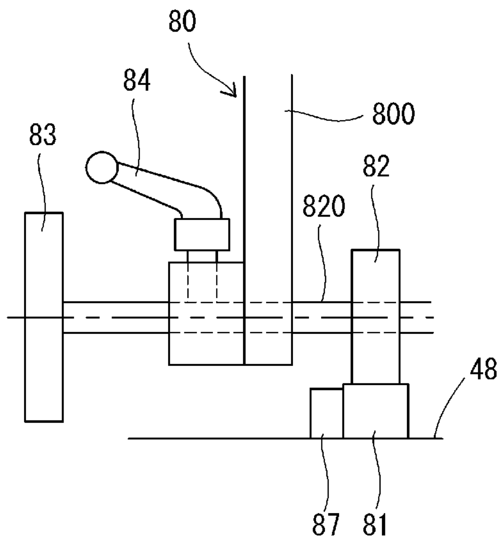
FIG. 7A is an E-line arrow view of FIG. 6.

FIG. 7A is an E-line arrow view of FIG. 6. As illustrated in FIG. 7A, the movement device 8 includes at least one rack 81 and at least one pinion 82 as a mechanism for moving the support arrangement 80 in the directions $Y_1$ and $Y_2$. The rack 81 is fixed to the main frame 48 of the bag making apparatus to extend in the direction $Y_1$. The pinion 82 is engaged with the rack 81 and its pinion shaft 820 is rotatably received by the support arrangement 80.

Specifically, the racks 81 are provided for each of the side frames 800 of the support arrangement 80, and the pinions 82 are located in the upstream and downstream portions of the side frames 800, and their pinion shafts 820 are inserted into the side frames 800.

As illustrated in FIG. 7A, the movement device 8 further includes a handle 83 to be operated by an operator for movement of the support arrangement 80, and a clamp 84 for fixing the support arrangement 80. The handle 83 is operably connected to the pinion shaft 820 of any one of the pinions 82. The clamp 84 is arranged to be able to releasably fix the pinion shat 820.

With the above configuration, the movement device 8 moves the support structure 80 (i.e., the pressure unit 6, the laser units 7, the pair of guide rollers 50, the pair of expansion rollers 51, and the guide body 52) upstream and downstream with respect to the sheet panel 1, the strip member 2, the seal device 44, and the cut device 45, in response to the operation of the handle 83 by an operator. At this time, the relative positional relationship between the pressure position $P_0$ and the irradiation position R (see FIG. 2B) is being maintained. After the movement, it is possible to secure the positions of the units 6 and 7 by fixing the pinion shaft 820 using the clamp 84.

Figure 7B:
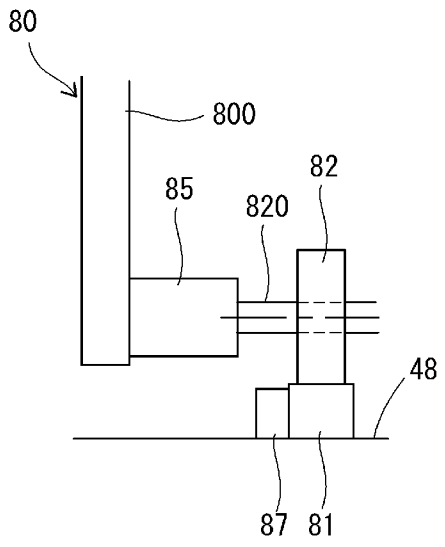
FIG. 7B is a view of another example.

Alternative to the manual operation using the handle 83, the movement device 8 may include a drive source 85 for automatically moving the support arrangement 80, as illustrated in FIG. 7B. The drive source 85 is operably connected to the pinion shaft 820. The drive source 85 is, for example, a servo motor. The drive source 85 may be connected to and controlled by the control device 47. This allows the control device 47 to control the movement device 8 to automatically move the units 6 and 7 upstream and downstream together. The units 6 and 7 may be moved based on detection by the various sensors described below, or in response to the above operation means receiving the operator's input operation.

This allows the position of the unwelded part Q on the sheet panel 1, which is generated as described above, to be adjusted in its longitudinal direction. In other words, it is possible to adjust the unwelded part(s) Q with respect to the devices located downstream of the welding device 5 (e.g., the seal device 44, the cut device 45, etc.). This can reduce the problems caused by the unwelded part Q.

For example, the bag making apparatus may include a scale (not illustrated) fixed to the main frame 48 of the bag making apparatus to extend along the feed path. The scale may indicate, for example, the distance from the cross cut position Pr of the cut device 45 as a reference position to a position upstream of the cross cut position Pr. The scale may indicate a rough position or distance. In addition, the accuracy of the indication may be increased within the movable range of the welding device 5.

An object 86 to be detected (FIG. 6) is mounted on the support arrangement 80 (e.g., the side frame 800) at the same position as the pressure position P0 with respect to the directions Y1 and Y2. A sensor 87 (FIGS. 7A and 7B) for detecting the position of the welding device 5 is fixed to the main frame 48. For example, the sensor 87 may be attached to the main frame 48, the rack 81, or the scale. The sensor 87 is capable of detecting the object 86.

When the sensor 87 detects the object 86 during the movement of the units 6 and 7 by the movement device 8, the control device 47 determines the position of the welding device 5 on the feed path at the time of detecting, specifically, any one of the positions $P_0$ to $P_4$, based on the detection by the sensor 87. For example, the control device 47 can determine the distance from the cross cut position Pr to any one of the positions $P_0$ to $P_4$, and may indicate this on the indicator 46.

Alternative to the above, the movement device 8 may be configured such that the sensor 87 is supported by the support arrangement 80 to read the scale or the object 86 on the main frame 48. The sensor 87 may be an optical sensor (including a camera), a magnetic sensor, or the like. The configuration of the object 86 is selected according to the type of sensor 87.

A reference position may be defined within the movable range of the welding device 5 on the feed path. A digital sensor for detecting the position of the welding device 5 may be used to determine the position of the welding device 5 with reference to this reference position. This allows for determining the position of the welding device 5 with high accuracy.

Examples of specific positioning of the units 6 and 7 are as follows.

The units 6 and 7 may be positioned with respect to the seal device 44 such that the seal device 44 can seal the sheet panel 1 over the aforementioned entire unwelded area q. This causes the sheet panel 1 and the strip member 2 to be sealed to each other in the unwelded area q, which results in solving the problems (e.g., leakage) caused by the unwelded part Q.

Figure 8:
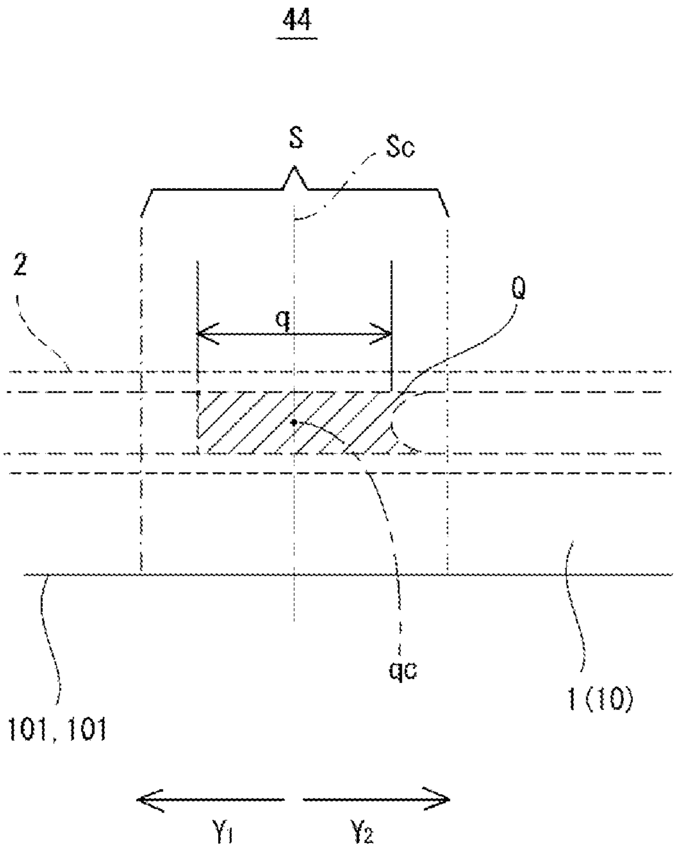
FIG. 8 illustrates positioning by a movement device.

FIG. 8 partially illustrates the seal position S where the seal device 44 (its seal members 440 in the implementation) seals. In FIG. 8, the part indicated with hatching is the unwelded area Q, and the area q in the unwelded area Q is the aforementioned unwelded area. As illustrated in FIG. 8, the seal device 44 and the welding device 5 should be positioned such that an unwelded center qc of an unwelded area q is located on the seal width center Sc of the seal position S every pause phase of the intermittent feed cycle.

Each upstream device is typically positioned with reference to the most downstream cut device 45, i.e., the cross cut position Pr. Thus, the seal device 44 and the welding device 5 (the units 6 and 7) may be adjusted with respect to the cross cut position Pr, so that the seal device 44 and the welding device 5 are positioned with respect to each other.

As described above, the seal device 44 and the cut device 45 have been properly positioned in advance. That is, the distance along the feed path between the cross cut position Pr and the seal width center Sc is an integer multiple of the feed pitch.

As is clear from FIG. 2B and the above description, the unwelded center qc corresponds to the position $P_1$ within the welding device 5. This position $P_1$ is the midpoint between the pressure position $P_0$ and the downstream end $P_2$ of the irradiation position R. Therefore, if the distance along the feed path from the cross cut position Pr to the position $P_1$ becomes an integer multiple of the feed pitch, the distance along the feed path from the seal width center Sc to the position $P_1$ also becomes an integer multiple of the feed pitch.

The units 6 and 7 should be adjusted with respect to the cut device 45 using the movement device 8 such that the distance between the cross cut position Pr and the position $P_1$ is an integer multiple of the feed pitch. Consequently, the units 6 and 7 are adjusted with respect to the seal device 44.

The irradiation angle θ and the distance of the section $P_0$-$P_2$ are known because they have been preset. The control device 47 is able to determine the position $P_1$ using the length of the unwelded area q obtained in advance and the configuration for detecting the pressure position $P_0$, as described above.

For the manual movement device 8 in FIG. 7A, the control device 47 may indicate the information regarding the positional relationship between the cross cut position Pr and the position $P_1$ on the indicator 46 based on the determined position $P_1$. For example, the control device 47 may indicate, on the indicator, the distance of the section Pr-$P_1$ along the feed path with reference to the cross-cut position Pr.

The control device 47 may also indicate, on the display as the indicator 46, the offset distance of the position $P_1$ relative to a separation position which is spaced upstream away from the cross cut position Pr by an integer multiple of the feed pitch along the feed path. As a specific example, the offset distance may be indicated on the display using +/− when the position $P_1$ is offset upstream from the separation position, while it may be indicated using −/+ when the position $P_1$ is offset downstream. This makes it easier for operators to know whether they should move the units 6 and 7 upstream or downstream.

For the automatic type of movement device 8 in FIG. 7B, the control device 47 may control the movement device 8 (drive source 85) based on the detection by the sensor 87 to automatically position the units 6 and 7 to make the distance between the cross cut position Pr (seal width center Sc) and the position $P_1$ an integer multiple of the feed pitch.

Where a plain sheet panel 1 is used, the adjustment may be carried out, for example, as follows. There is a considerable distance between the cut device 45 and the welding device 5. The sheet panel 1 which is made of material such as film can stretch or shrink depending on environmental conditions including temperature and humidity. However, for a plain sheet panel 1, if the feed pitch is fixed and the distance of the section Pr-$P_1$ is adjusted to an integer multiple of the feed pitch, the unwelded center qc will not deviate significantly from the cross cut position Pr.

For example, an operator may visually check the positional relationship between the unwelded center qc and the seal width center Sc to confirm misalignment. The operator can then operate the manual movement device 8 in FIG. 7A to cancel the misalignment.

For the configurations that include the aforementioned digital type sensor, it is possible to determine the exact distance of the section $P_r$-$P_1$, which allows for more accurate positioning. When the seal width center Sc and the unwelded center qc are misaligned due to stretch or shrink of the sheet panel 1, an operator can visually check this misalignment and then fine-adjust it using the movement device 8.

Figure 5B:
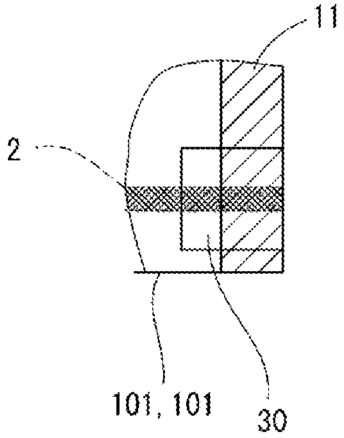
FIG. 5B is a partial enlarged view of FIG. 5A.

As illustrated in FIGS. 5A and 5B, in making the bags 3 each with the zipper 2, a crushed section 30 with a width greater than the width of the cross sealed section 11 may be formed to completely melt and closely adhere the male and female members 21 and 22 of the zipper 2. This crushed section 30 ensures the sealability of the bag 3 (see Patent document 6).

Figure 9:
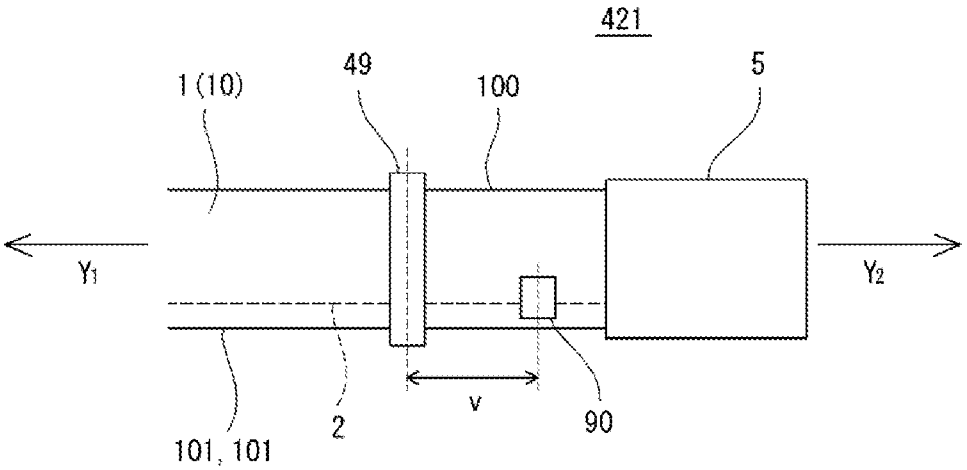
FIG. 9 illustrates positioning by a movement device.

In this case, as illustrated in FIG. 9, the bag making apparatus may include a point seal device 49 in the intermittent feed zone 421, which seals the sheet panel 1 and the zipper (strip member) 2 in a point-like manner to form a crushed section 30. The point seal device 49 is disposed, for example, downstream of the welding device 5 and upstream of the seal device 44.

The unwelded area q may be completely contained in the crushed section 30 formed by the point seal device 49. For this purpose, a sensor 90 such as a camera for detecting the positions of the unwelded areas q is arranged to be spaced upstream away from the point seal device 49 by a distance v. Since the unwelded area q is optically different from the surrounding area thereof, the sensor 90 can optically detect the unwelded area q. The control system 47 determines the position of the unwelded area q based on the detection by the sensor 90.

For example, the control device 47 may process (image-process) the data obtained from the sensor 90 to determine the position of the unwelded area q, thereby determining the distance between the area q and the point seal position of the point seal device 49. The control device 47 then compares this determined distance to a predetermined threshold value to determine whether the welding device 5 (units 6, 7) should be moved in the direction $Y_1$ or $Y_2$, and also determines the distance by which it should be moved. The control device 47 may then indicate the information regarding the determined direction and the determined distance on the indicator 46. An operator adjusts the units 6 and 7 with respect to the point seal device 49 using the movement device 8 considering that information, such that the entire unwelded area q is contained in the crushed section 30. The control device 47 may do that automatically by controlling the movement device 8 based on the detection by the sensor 90.

The control device 47 may indicate the image pertaining to the data acquired from the sensor 90 on the indicator 46. If it is difficult to automatically identify the unwelded part Q using the sensor 90, an operator may see the above image displayed on the indicator 46 to determine the position of the unwelded part Q, and manually operate the movement device 8.

The sensor 90 may be supported, for example by the main frame 48, to be displaceable in the directions $Y_1$ and $Y_2$. This allows the position of the sensor 90 and thus the distance v to be adjusted according to the dimensions of the bags 3 to be made.

A sheet panel 1 with print patterns may be used. The print patterns are repeatedly printed on the sheet panel 1. In this case, the units 6 and 7 may be positioned based the print pattern(s), especially the mark M (FIG. 10B), such as a register mark included in each print pattern.

Figure 10A:
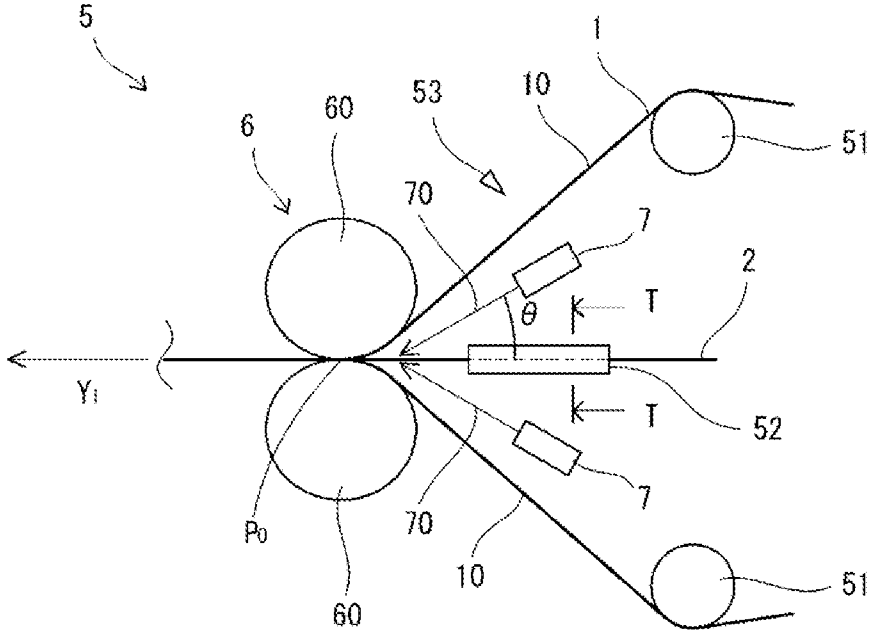
FIG. 10A and FIG. 10B illustrate positioning by a movement device.

For example, as illustrated in FIG. 10A, a sensor 53 for detecting the positions of the print patterns is placed upstream of and in the vicinity of the pressure rollers 60. Specifically, the sensor 53 is capable of detecting the marks M (in the implementation, the register marks). The sensor 53 is configured to be movable together with the units 6 and 7 by the aforementioned movement device 8. For example, the sensor 53 may be supported by the support arrangement 80. The sensor 53 may be displaceably supported by the support arrangement 80, so that it is possible to change its position according to the dimensions of the bags 3.

The distance along the feed path for the sheet panel 1 between the detection position of the sensor 53 and the pressure position $P_0$ is known. Therefore, the control device 47 can determine the relative positional relationship between the position of the print pattern (mark M) and the unwelded area q based on the detection by the sensor 53.

Figure 10B:
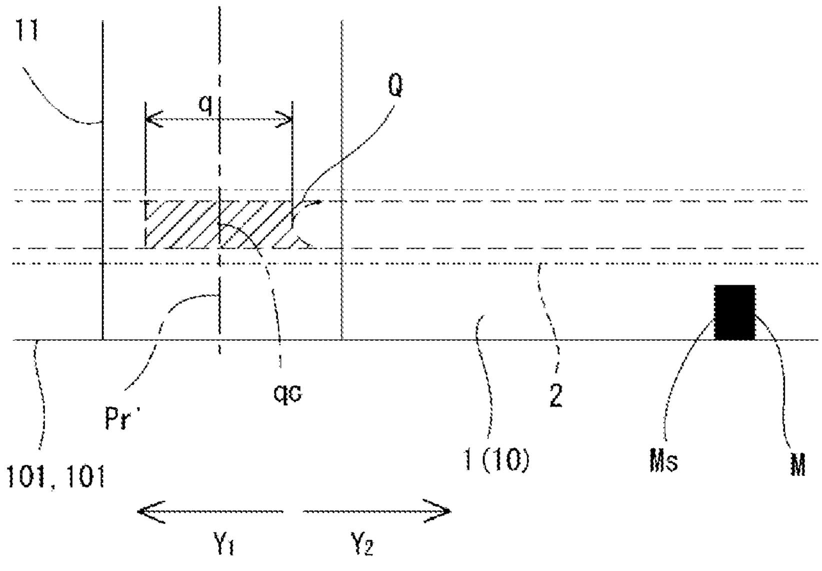

For example, as illustrated in FIG. 10B, if the design distance on the sheet panel 1 from the position Pr' where the sheet panel 1 is to be cross-cut, to the edge Ms of the mark M is 96 mm and the length of the unwelded area q (the distance of the section $P_0$-$P_2$) is 8 mm, the distance from the detection position of the sensor 53 to the pressure point $P_0$ should be 100 mm (=96+8/2). This ensures, combined with the adjustment of the positional relationship between the cross cut position Pr and the mark M using the sensor etc. described below, that the sheet panel 1 is cross-cut at the unwelded center qc if the sensor 53 detects the edge Ms of the mark M during the pause phase of the intermittent feed cycle.

The sensor 53 and the pair of pressure rollers 60 have been adjusted in advance to the above positional relationship. If the sensor 53 does not detect the edge Ms during the pause phase of the intermittent feed cycle, the distance between the mark M and the unwelded center qc is considered to be longer than the design distance. Therefore, if so, the control device 47 controls the movement device 8 to move the units 6 and 7 and the sensor 53 slightly upstream (in the direction $Y_2$) during the next feed phase.

In contrast, if the sheet panel 1 is paused after the sensor 53 detects the edge Ms, the distance between the mark M and the unwelded center qc is considered to be shorter than the design distance. Therefore, if so, the control device 47 controls the movement device 8 to move the units 6 and 7 and the sensor 53 slightly downstream (in the direction $Y_1$) during the next feed phase.

Such positioning of the units 6 and 7 is repeated every intermittent feed cycle. Therefore, it is possible to make sure that the cross cut position Pr and the unwelded center qc almost always align with each other during cross cutting.

If the cross cut position Pr and the unwelded center qc are significantly misaligned during cross cutting due to unforeseen circumstances, they can fail to be easily recovered even after the above positioning is repeated. In this case, the control device 47 may indicate warning on the indicator 46.

Figure 11:
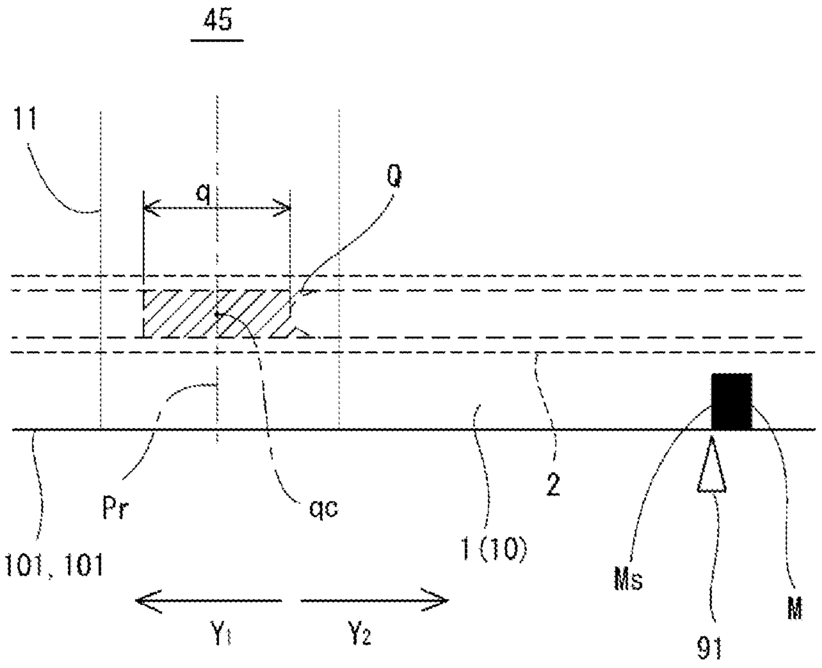
FIG. 11 illustrates positioning by a feed device.

As illustrated in FIG. 11, the sensor 91 for detecting the positions of the print patterns may be disposed upstream of and in the vicinity of the cut device 45. The sensor 91 is configured to detect the marks M in the same way as the aforementioned sensor 53. The cross cut position Pr and the detection position of the sensor 91 are in the same positional relationship as the pressure position $P_0$ and the sensor 53.

If the sensor 91 does not detect the edge Ms during the pause phase of the intermittent feed cycle, the control device 47 controls the feed device 40 to slightly increase the feed pitch of the next intermittent feed. In contrast, if the sheet panel 1 is paused after the sensor 91 detects the edge Ms, the control device 47 controls the feed device 40 to slightly reduce the feed pitch of the next intermittent feed.

Such pitch adjustment is repeated every intermittent feed cycle. As a result of the above processes, both the positional relationship between the mark M and the position $P_1$ of the welding device 5 (corresponding to the unwelded center qc) and the positional relationship between the mark M and the cross cut position Pr of the cut device 45 are maintained in the design positional relationship. Therefore, it is guaranteed that the unwelded center qc on the sheet panel 1 substantially matches the cross cut position Pr during cross-cutting. This and the aforementioned adjustment of the units 6 and 7 using the sensor 53 may be carried out independently and simultaneously.

The distance from the seal width center Sc of the seal device 44 to the cross cut position Pr of the cut device 45 in the above implementations has been adjusted in advance to be an integer multiple of the feed pitch. Alternatively, the positional relationship between the seal width center Sc and the sheet panel 1 may be adjusted using sensors in the same way. For example, the bag making apparatus detects the position of the mark M on the sheet panel 1 during the pause phase of the intermittent feed cycle of the sheet panel 1 using a sensor located in the vicinity of the seal device 44. Then, if the mark M has advanced beyond the design position, the bag making apparatus decreases the amount of the next intermittent feed of the sheet panel 1, or moves the seal members of the seal device 44 (e.g., the heat seal bars in the implementation) (and thus the seal width center Sc of the seal device 44) downstream. In contrast, if the position of the mark M is delayed relative to the design position, the bag making apparatus increases the amount of the next intermittent feed or moves the seal members (seal width center Sc) upstream.

The method of adjusting each device in the bag making apparatus and/or the feed pitch of the sheet panel 1 may be determined as appropriate, taking into consideration the overall configuration of the bag making apparatus.

In yet another implementation, at least one sensor may be provided for detecting the positions of the print patterns and for detecting the positions of the unwelded parts Q. Based on the detection by the sensor, the control device 47 may determine the positional relationship between the print pattern and the unwelded part and indicate the information regarding this on the indicator 46, or control the movement device 8 to position the units 6 and 7.

For example, an optical sensor such as a camera is used as the sensor. The control device 47 image-processes the data from this sensor to determine the relative positional relationship between the mark M and the unwelded part Q (unwelded area q). The control device 47 may then indicate the information regarding the relative positional relationship on the indicator 46. Alternatively, the control device 47 may control the movement device 8 based on the relative positional relationship to position the units 6 and 7 in the same way as the above implementations. Of course, when it is difficult to automatically identify the unwelded part Q as described above, an operator may visually check the image indicated on the indicator 46 to determine the position of the unwelded part Q, and manually operate the movement device 8.

The sensor for detecting the positions of the print patterns and the sensor for detecting the positions of the unwelded parts Q may be separate components.

As described above, some implementations make the mutual distance among the welding device 5 (its position $P_1$), the seal device 44 (its seal width center Sc), and the cut device 45 (its cross cut position Pr) an integer multiple of the feed pitch. This allows the unwelded part Q (unwelded area q), which is generated in laser welding, to be completely contained within the cross sealed section 11 and thus be eliminated, and the cut device 45 to cross-cut the sheet panel 1 at the width center of the cross sealed section 11.

In the implementations that use a sheet panel 1 with print patterns, the positional relationship between the sheet panel 1 and the devices 44, 45 and 5 is adjusted at the process positions of the respective devices 44, 45, and 5 based the print pattern(s) (mark M) to align the unwelded center qc, the width center of the cross sealed section 11, and the position Pr' where it is to be cross-cut, among each other. This also allows for the disappearance of the unwelded parts Q (unwelded areas q) and accurate cross-cutting at the width center of each cross sealed section 11. This is particularly effective in bag making using the sheet panel 1 made of highly stretchable mono-material such as polyethylene, polypropylene and so on.

The implementations have been described above.

The movement device 8 and its support arrangement 80, etc., may be modified depending on bag making methods. For example, when two separate sheet panels are used as in Patent documents 1 and 2, the base shaft 801, etc. may be supported by both side frames inteated of only one side frame 800. This is also applicable to multi-line bag making.

The strip member 2 in the above implementations is the zipper which includes the male member and the female member fitted to each other. Alternatively, the strip member 2 may be, for example, a male member of a zipper, a female member of a zipper, a male member of a hook-and-loop fastener, a female member of a hook-and-loop fastener, a hook-and-loop fastener (which includes a male member and a female member engaged with each other), an adhesive tape, a seal tape, a tape-like reinforcing member, a tape-like decorative member, a tape-like header of a bag, and so on.

For welding, the sheet panel 1 may be irradiated with the laser beam 70 to be melted. In this case, the light absorbing layer is provided not on the strip member 2 but on the sheet panel 1.

The above disclosure can also be applied to so-called pillow-bag making method, or can be applied to a bag making method which includes welding the sheet panels to each other in their longitudinal (continuous) direction.

EXPLANATIONS OF LETTERS OR NUMERALS

1 sheet panel
2 strip member
3 bag

40 feed device
44 seal device
45 cut device
46 indicator
47 control device
5 welding device
6 pressure unit
60 pair of pressure rollers (as an example of a pair of pressure members)
7 laser unit
70 laser beam
8 movement device
53, 87, 90, 91 sensor
$P_0$ pressure position of a pressure unit
$P_1$ midpoint between a pressure position and a downstream end of an irradiation position
Pr cross cut position
Q unwelded part
q unwelded area
qc unwelded center
R irradiation position of a laser unit
S seal position
Sc seal width center

What is claimed is:

1. A bag making apparatus for successively making bags from a continuous sheet panel and a continuous strip member, the bag making apparatus comprising:

a feed device configured to intermittently feed the sheet panel and the strip member in a longitudinal direction of the sheet panel and the strip member;

a welding device configured to weld the sheet panel and the strip member to each other in a zone where the sheet panel is intermittently fed by the feed device; and a cut device disposed downstream of the welding device and configured to cross-cut the sheet panel and the strip member in a width direction of the sheet panel during every intermittent feed cycle, the welding device comprising:

a pressure unit comprising a pair of pressure rollers for pressurizing the sheet panel and the strip member superposed on each other during a feed phase of an intermittent feed cycle; and a laser unit configured to irradiate the sheet panel or the strip member with a laser beam at an irradiation position spaced upstream away from a pressure position of the pressure unit to melt the sheet panel or the strip member using the laser beam, wherein a part of the sheet panel or the strip member irradiated with the laser beam returns to a non-molten state due to decrease in temperature in a section from the irradiation position to the pressure position during a pause phase of an intermittent feed cycle, so that an unwelded part is generated every intermittent feed cycle, the bag making apparatus further comprising:

a movement device for moving the pressure unit and the laser unit together upstream and downstream while maintaining a relative positional relationship between the pressure position and the irradiation position; and a control device configured to control the movement device to move the pressure unit and the laser unit together upstream and downstream during a pause phase of an intermittent feed cycle, thereby adjusting a position on the sheet panel where the unwelded part is generated, in the longitudinal direction of the sheet panel.

2. The bag making apparatus of claim 1, further comprising a sensor for detecting a position of the welding device, wherein the control device is configured to control the movement device based on detection by the sensor.

3. The bag making apparatus of claim 2, wherein the bag making apparatus is configured to make a midpoint between the pressure position and a downstream end of the irradiation position spaced away from a cross cut position of the cut device by an integer multiple of a pitch of intermittent feed along a feed path.

* * * * *